Patented Oct. 3, 1939

2,174,755

UNITED STATES PATENT OFFICE 2,174,755

MANUFACTURE OF SYNTHETIC RESIN BONDED ABRASIVE ARTICLES

Emil E. Novotny, Philadelphia, Pa., assignor, by mesne assignments, to Durite Plastics, Incorporated, Philadelphia, Pa., a corporation of Pennsylvania No Drawing. Application July 14, 1936, Serial No. 90,490

19 Claims. (Cl. 51—278)

My present invention relates to the manufacture of synthetic resin bonded abrasive articles.

In the prior art a number of processes have been suggested for mixing synthetic resin with abrasive grains, which aimed to produce dry mixes suitable for cold-molding abrasive articles. Among these may be mentioned two methods which have been adopted commercially on a wide scale. One method consists in wetting the grains with a solvent, such as furfural, and then adding a dry pulverized potentially reactive synthetic resin. The second method consists in coating the abrasive grains with a liquid synthetic resin and then adding the dry pulverized synthetic resin. The furfural-solvent method is difficult to control because of the tendency to produce sticky masses instead of dry granular mixes. With the liquid resin-dry resin method, dry mixes may be obtained with greater uniformity, but to accomplish this an excess of dry resin must be used, and this results in a large percentage of dry pulverized resin which remains unsuspended and vagrant in the abrasive mix; if the proportion of liquid resin is increased so that the mix is wet enough to take care of all of the dry resin, the mixture remains wet or becomes "sticky" or "cakes" and does not dry out to produce the desired individual discrete resin-coated abrasive grains.

The primary object of my present invention centers about the provision of an improved method of making synthetic resin bonded abrasive articles wherein there is produced a wet abrasive mix which is self-convertible to a dry granular mix. Among the prime results accomplished, are: The initial mix being wet, there is no unsuspended dry resin, and the resin is all coated on the abrasive grains; the wet mix changes spontaneously to a dry granular mix composed of discrete resin-coated abrasive particles; each resulting abrasive grain is coated most efficiently, the grain having a glazed vitreous appearance with the effect being as though the resin had been fused or melted onto the abrasive grain; a dry granular mix is obtained of such a character that the same may be leveled very simply by merely pouring into a mold cavity where the same may be readily compacted under pressure to produce molded products; the mix has a long life, that is, it remains in a moldable condition over a period of several days; and the molded abrasive articles when cured are characterized by superior strengths both hot and cold.

In the method of my present invention, as in the prior methods above referred to, I intermix abrasive grains, a liquid material which forms both an initial and ultimate bond, and a dry pulverized synthetic resin, the liquid material being preferably a resinous liquid. In accordance with the principles of my present invention, the liquid material and the dry resin are formulated so that when the dry resin is mixed with the liquid coated abrasive grains, the mixture is at first a wet mass, and the dry resin and the liquid material mutually react to rapidly and spontaneously break up the mass into individual discrete resin coated abrasive grains.

I have found that a number of factors govern the desired reaction between the liquid material and the dry resin to accomplish the stated results, and that this reaction is governed by the characteristics of the liquid material and preferably of both the liquid material and the dry resin.

The liquid material to produce the best results should be compatible with the added dry resin, that is, the liquid material should be more or less akin to the dry resin; such material may be found in suitably processed liquid phenol-aldehyde resins (where the added dry resins are also of the phenol-aldehyde type); and these types of resins have been found most suitable for a variety of reasons.

The physical state of the dry resin also affects the rate of reaction; various modifying agents such as hexamethylenetetramine greatly influence this factor; the alkalinity or acidity of the dry resin is also taken into consideration for securing optimum results.

I have found that a suitably processed resinous liquid as of the phenol-aldehyde type should have a controlled amount of resinification. It should also preferably contain a portion or component (low reaction products) which is a substantial solvent for the dry resin or a portion thereof; the character and quantity of this solvent portion appears to influence the rate of reaction between the resinous liquid and the added dry resin. It should also preferably contain a portion or component of resinous material so far advanced in reaction as to render it a poor solvent, or relatively a nonsolvent for the dry resin, which acts to influence the rate of mutual solution between the solvent portion of the resinous liquid and the dry resin. Also to secure optimum results, water and an alkali such as NaOH are employed as components of the resinous liquid and these also serve to govern the desired reaction between the resinous liquid and the added dry resin.

To yield abrasive mixes of the desired properties, the liquid material or liquid resin should be possessed of certain physical and chemical characteristics as regards the initial surface tension, the initial viscosity and the effect upon the surface tension and viscosity that the process of mutual reaction brings about.

The following is a preferred example of the method of obtaining a wet-dry mix following the principles of my present invention and using the preferred materials. I weight out 21 parts by weight of #24 aluminous oxide placing this into a rotary cylindrical mixer. 0.75 part by weight of liquid resin, now known commercially as Durite No. S-1719, is then added to the abrasive grain and mixed for three minutes. Then 2.25 parts by weight of pulverized "A" stage potentially reactive fusible resin, now known commercially as Durite No. KV-1000-B, is added to the mass, and mixed for two minutes. The resulting wet mass is then preferably passed through a 10 mesh screen. The screened wet product is then spread out in a thin layer of approximately ½ inch. In approximately 5 minutes' time the product spontaneously converts to a dry granular mix comprising individual abrasive grains uniformly coated with resin. The granular mix is then leveled in the mold by shaking and cold pressed at 4000 pounds per square inch. The piece is then ejected from the mold. The pressed pieces are placed upon vitreous slabs and placed in an oven and baked for 25 hours, starting at 180° F. and finishing at 400° F. The baked pieces may then be allowed to gradually cool down to room temperature.

Tensile strengths per square inch of figure eight test pieces made in the above manner, where the parts were taken in ounce weights, were 2575 pounds when broken hot or at a temperature of 400° F. and 2820 pounds when broken cold or at room temperature. In the self converted dry mix there is no unsuspended or vagrant dry resin. For this same grit size and resin proportion, a prior art liquid resin-dry resin mix made into figure eight test pieces and evaluated in tensile strength per square inch gives a hot strength of 335 pounds and a cold strength of 2000 pounds. With the liquid resin-dry resin method a similar composition shows vagrant resin varying from 9 to 15%.

My present preferred resinous liquid or liquid resin is what may be described as an aqueous alkaline liquid resin or resinous liquid. This is described and separately claimed in my co-pending application, Serial No. 90,489, filed July 14, 1936. I preferably use phenol and commercial U. S. P. formaldehyde in the ratio by weight of 1:0.9 or such other ratio to yield a potentially reactive product, and retain sufficient water of the formaldehyde solution to provide a product having the characteristics required by me and produce a liquid having preferably 35% volatiles (water content) retained. In charging the still I preferably start off with the entire quantity of phenol and I add thereto a solution of C. P. sodium hydroxide dissolved in a minimum of water, and I then add approximately 30% of the total formaldehyde called for, which is approximately the quantity of higher reacted resinous products desired in the resinous liquid to be produced. These products are then brought up to the boiling point and reacted. Tests are then made to determine the gram moles phenolic (OH) groups inactivated. A suitable amount of water is then distilled out, having in view that at the end of the completed reaction the percentage of water will be within the limits hereinafter referred to. The additional formaldehyde is then added preferably at a temperature of 150° F. and the balance of the reaction is proceeded with, the reaction being carried to the point where the formaldehyde is substantially all combined. Tests are then made to determine the condition of inactivation of the OH groups and the condition of the resinification of the product. The reaction is then further carried on after the formaldehyde is all tied up and further water distilled so that the composition of the liquid will be within the limits hereinafter referred to. The reaction is thus carried out so that a portion of the formaldehyde is added sufficient in quantity to give a certain percentage of the more highly reacted products, and this reaction is carried out at relatively high temperatures, the degree of reactivity then determined and the kettle charge cooled down and additional formaldehyde gradually added and the reaction carried out at lower temperature (to provide the low resinification products as such products are more readily obtained through a reaction carried on at low temperature), the composition is then again tested and when the reaction has provided the proper admixture of high and low resinification products the charge is further cooled and any excess of water is removed at high vacuum and low temperature and the pH is adjusted by the addition of alkali dissolved in a minimum quantity of water.

This aqueous alkaline resinous liquid should be controlled within close limits as otherwise optimum working conditions may not be produced; and therefore if the product is not properly controlled a dry mix may result in the mixing operation with resultant vagrant unsuspended resin, or a wet mix may result which will form clumps and clusters or ball up, or may not dry out with commercial rapidity or may even be hygroscopic and become more sticky and tacky upon standing.

The preferred physico-chemical limits of the preferred liquid resin coating material may be thus charted and explained:

*Resin solution data*

| Test constants | Preferred limits | | | Possible limits | |
|---|---|---|---|---|---|
| | Low | Choice | High | Low | High |
| Viscosity, centipoises, 25° C | 60 | 100 | 200 | 50 | 375 |
| pH value, Beckman electrometric | 9.0 | 9.3 | 9.8 | 7.3 | 14 or over |
| Water solubility ratio by weight. Alkaline resin solution given as 1 | 1:2.8 | 1:3.1 | 1:3.5 | 1:1 | 1:5 |
| Water tolerance in methanol | 180 ml. | 230 ml. | 300 ml. | 50 ml. | 400 ml. |
| Gram moles phenolic (OH) groups originally present [1] | 0.25 | 0.556 | 0.80 | 0.10 | 0.90 |
| Gram moles phenolic (OH) groups inactivated per 100 gr. of resin solution | 0.10 | 0.125 | 0.3 | 0.05 | 0.40 |
| Phenolic (OH) inactivated per cent of original phenolic (OH) groups in the resin solution | 18 | 22 | 27 | 10 | 40 |
| Ratio of alkaline material free to combine with phenolic (OH) groups [2] | 0.08 | 0.12 | 0.15 | 0.01 | 1.2 |
| "A" stage resinification factor | 10 | 14.7 | 25 | 5 | 45 |
| Water content per cent | 25 | 35 | 45 | 10 | 55 |
| Rate of evaporation per cent loss: | | | | | |
| (a) Room conditions, 30 minutes | 8.00 | 12.90 | 18.00 | 5.00 | 25.00 |
| (b) Vacuum, 29⅜", 24 hours | 17.00 | 26.50 | 29.00 | 16.00 | 40.00 |

[1] Gram moles phenolic (OH) groups originally possessed by the phenols that went into the making of 100 gr. of the resin solution.

[2] Ratio: $\dfrac{\text{Gr. normal wts. alkaline materials free to combine with phenolic (OH) groups}}{\text{Gr. moles phenolic (OH) groups in the resin solution.}}$ The viscosity is an important factor and the limits thereof are close; for even at the high limit given the product is of low viscosity, low internal coherence and low surface tension. A product of high viscosity is not suitable.

Generally stated, the pH value of this preferred material is so gauged that it is preferably somewhat below the point at which a marked buffering tendency is indicated. That is, up to a pH of approximately 10 only a small amount of base is needed to rapidly raise the pH value, and for the same reason when the dry pulverized resin is added the slight acidity of the resin rapidly lowers the pH value to a point where the resin separates from the aqueous solution and the water is probably external to the mix.

Water solubility ratio is an indication of the degree that the resin has been reacted. This ratio is determined by weighing out a unit of the resin solution and adding thereto a quantity of distilled water and the reading is taken at the point where turbidity persists after stirring.

The terms "phenolic (OH) groups inactivated" and "'A' state resinification factor" may be considered together. In my aforesaid co-pending application, these and the other factors are treated at length; it may be here briefly explained. The inactivated (OH) groups represent phenolic (OH) groups which were originally present in the phenols, but which because of the reactions which have taken place during resinification, no longer respond to the test for such groups. Phenolic (OH) groups inactivated, taken with the "gram moles phenolic (OH) groups originally present", "gram moles phenolic (OH) groups inactivated per 100 grams of resin solution" and "'A' stage resinification factor", set the limits in a substantial way to the low reaction products and the more advanced reaction products in the resinous liquid or resin solution. All phenol aldehyde liquid resins which have been tested reveal that less than half the original phenolic (OH) groups have become inactivated. As the viscosity of a resin of a given formulation increases, so too does the percentage of original phenolic (OH) groups that become inactivated increase, and as the resin becomes solid, the value for a completed "A" stage resin is reached, and this is a value in the vicinity of a percentage of 50. The percentage of original (OH) groups that has become inactivated may be referred to as the "inactivation factor." This inactivation factor may be looked upon as a generalized "resinification factor", referred to in the table), since its values are indicative of the extent to which resinification has progressed.

The "water solubility ratio" and the "water tolerance in methanol" are also indicative as to the relative amounts of free phenols, low reaction products and more advanced reaction products in the resinous liquid or resin solution.

Water content, per cent, is calculated on the total weight of the coating liquid. The term "water" is used in its ordinary sense irrespective of whether it is present as an addition product or as a result of some chemical change. It may represent the liquid product of a non-resinous and liquid nature which remains with the resin after the reaction of a phenol-formaldehyde material has been completed, or it may represent water plus some other suitable ingredient.

The manner in which these factors appear to govern the obtained results may be further treated.

The lowly reacted resinification products in the resinous liquid which may also include small quantities of certain unreacted products such as phenol, and certain non-resinous reaction products such as phenol alcohol, etc., may briefly be functionally termed the "coherer." This combination of products (coherer) has a determined solvent action for other more highly reacted resinous products such as those present in the resinous liquid or those added in the form of a dry pulverized resin.

The more highly reacted products in the resinous liquid may be functionally referred to as the "regulator"; this comprises a graded mixture of products so far advanced in reaction as to be a poor solvent or relatively a non-solvent for the pulverized resin. The regulator aids in regulating the viscosity, in controlling the rate of solution in the mixing process, and augments the rate at which the viscosity increases in the mixing, and therefore augments the rate of conversion of the mix from the wet to the dry state.

The water in the resinous liquid is essential for the attainment of the self-conversion of the mix. The water may be functionally referred to as the "incoherer." More broadly, the incoherer designates a non-resinous liquid body of low viscosity, high surface tension, volatile at room temperature, and chemically neutral, which is preferably water, although hydrogen peroxide would be a more expensive equivalent. The function of the water is at least three-fold. Firstly, it aids in lowering the initial viscosity without increasing the solvent properties for the solid resin, as would be the case if the water were replaced by other thin fluid materials, such as phenol, phenol alcohol and the lower condensation products; secondly, the water increases the effective surface tension of the film surrounding the coated abrasive grains; and, thirdly, it plays an important part in self-converting the wet mix to the dry state. As the mixing proceeds and the reaction between the liquid and dry resins progresses, the solid resin dissolves or soaks up primarily those constituents of the liquid resin that are solvents for it. Thus of necessity in a direction away from the solid resin phase the water concentration is automatically increased. As the concentration of water apparently increases near the outer boundaries, the physical characteristics of this outer shell gradually take on more and more of the characteristics possessed by water as distinguished from those of the original liquid resin—namely, the $H_2O$ vapor pressure goes up, the surface tension increases, and the viscosity diminishes. The increase in surface tension causes the surface film to resist outside forces and thus there will be less a tendency to wet other adjacent materials, that is adhesion is diminished. The decrease in viscosity directly diminishes the forces that cause like particles, i. e. coated abrasive grains, to cohere or stick together. The increase in aqueous vapor pressure also tends in this direction and greatly facilitates the evaporation of water. Thus, initially the coated abrasive grains are possessed of such surface tension and viscosity as to give rise to "wetness", and as the mutual reaction proceeds the mix becomes less and less cohesive. If now the mix is permitted to stand so that at least some of the water films evaporate, there is left on the coated grains a fluid film which is inadequate to cause grain to grain cohesion; thus a stable dry mix results.

The alkali, such as NaOH, may functionally be referred to as the "solubilizer." The solubilizer provides compatibility to the water and prevents the same from extending an excessive insolubilizing effect upon the low reaction products. In combination with the water it comprises an aqueous alkaline liquid which converts the resin of the resinous liquid to an aqueous alkaline solution. The alkali or solubilizer thus aids in regulating the water tolerance and the rate at which water concentrates on the outer surfaces of the abrasive grains as they become coated with the resinous mixture. The alkali also aids in controlling the rate of mutual solution and in lowering the surface tension. In a sense, the alkali may be looked upon also as a coupling agent between the water and the non-water portions that result from the solution of the solid resin into the solvent portions of the liquid resin.

I have found that these components of the resinous liquid should for optimum results, be combined in the following approximate proportions, these proportions being given merely in a broad way, but in no limiting sense:

| | Per cent |
|---|---|
| Coherer (the low reaction products, etc.) | 40 |
| Regulator (the more advanced reaction products, etc.) | 30 |
| Incoherer (in this case, water) | 28 |
| Solubilizer (in this case, NaOH) | 2 |

The initial surface tension of the resinous liquid should be sufficiently low so as to permit a ready and complete wetting of the abrasive grains by the resinous liquid and its initial solution products that result when the solid resin dissolves into it. The initial viscosity should be low enough to permit of a ready flow so that the forces of surface tension can exert their full play and so that all irregularities in the grain may be filled without air entrapment.

The pulverized resin may be the usual or ordinary fusible resin such as is used as a bond in the abrasive wheel industry; the qualities of the bond will vary with the characteristics of the resin used. Broadly, any resin having a suitable solubility or fusion point may be used in this wet-dry process. Preferably, however, I use the fusible pulverized potentially reactive resins of phenol-aldehyde derivation such as phenol-formaldehyde resins and these may be of either the one-stage or two-stage type. In the latter case the hardening agent such as hexamethylenetetramine is admixed with the resin presenting a mixture of granules of resin and hardening agent. Usually 10% of the pulverized resin composition comprises hexamethylenetetramine. This admixture of resin particles and hexamethylenetetramine particles does not provide the utmost uniformity in coating, as in such heterogeneous mixture the hexamethylenetetramine is a compound of a strong base and a weak acid and is readily and completely soluble in an aqueous medium whereas the resin itself without this hardening agent is weakly acid and readily combines with the relatively strong base contained in the aqueous alkaline coating medium; and then too the amount of liquid coating medium is proportioned relatively small with respect to the bulk and weight of the pulverized resin. In the presence of water these usually used resins show an alkaline or neutral reaction in a neutral aqueous medium and therefore the reactivity of the aqueous alkaline medium comprising the incoherer and solubilizer depends upon the slow reactivity due to the formation of resinates.

The preferred pulverized potentially reactive resin is a special type of phenol-aldehyde or phenol-formaldehyde resin capable of promoting compatibility between it and the resinous solution. Preferably this pulverized resin has a pH lower than 7 or on the acid side and contains acid bodies admixed therewith and preferably acid bodies forming an integral part thereof, as through the formation of addition compound coatings of an acid nature. Any acid body can be used, but I prefer to use oxalic, phosphoric, boracic or benzoic acids, but in general acids of an organic or inorganic nature forming addition compounds, whereby the reactivity between the water and alkali of the resinous liquid and the acid takes place rapidly so that the water (incoherer) is liberated almost as soon as the mixing is completed. The use of resins of a potentially reactive type of an acid nature or having acids such as oxalic added thereto provide bonds having high strength while hot thereby increasing the life and durability of a grinding wheel.

I preferably use addition compounds of say formaldehyde, hexamethylenetetramine or more broadly substances which contain or are convertible into substances which will contain —CHO or =CH$_2$ groups, that is aldehydes, the condensation and polymerization products of aldehydes, and the aldehyde derivatives of hydrogen, sulphur, etc. For my purpose I am especially interested in the well known hexamethylenetetramine hardening agent which is, however, used in a new and novel manner. Among the classes of addition compounds of hexa that I particularly have in mind are those derived by reacting hexamethylenetetramine or its equivalent with the following: Organic or inorganic acids with hexa complexes equal to or less than the number of acidic groups, compounds containing phenolic (OH) groups, acids plus bases or metals yielding tri addition compounds, compounds containing reactive unsaturated linkages, acids plus aldehyde-yielding tri addition compounds, and compounds containing substituted reactible electro-negative groups, e. g. NO$_2$, Cl, Br, etc.

I have found that hexamethylenetetramine in the presence of water readily forms addition products with the dry pulverized resin particles, and as such resin usually contains sufficient moisture, and if hexamethylenetetramine is added and thoroughly ground or ball milled with these pulverized fine mesh particles of resin, usually about 200 mesh, that a coating is provided on the resin comprising a hexamethylenetetramine addition product which is no longer water soluble. This 200 mesh or smaller resin coated particle having the hexamethylenetetramine hardening agent spread over the resin granule, wets readily without the hexa going into solution and adheres to the abrasive grain with great uniformity; and when the coating liquid is so proportioned to the coated resin granules to provide a wetted product throughout there is little or no vagrant dry pulverized resin in the mix.

For purposes where products are desired having a great tensile strength at temperatures around 400° F. and higher, as at the surface of a grinding member while in operation where heat is continually generated, I prefer as a hardening agent, products, which eliminate or minimize the presence of ammonia salts, these hardening agents being used preferably as coatings on the pulverized resin and in most cases such coatings will likewise be addition products therewith. Therefore hexamethylenetetramine while useful is preferably substituted for by its addition compounds, particularly those that are so constituted as to liberate a minimum quantity of ammonia in the hardening reaction, a property possessed to a slight degree by the normal salts of hexamethylenetetramine, that is hexamethylenetetramine hydrochloride, sulphate, etc., but more particularly by specific hexa addition compounds of acids comprising a group such as mono- or di-hexamethylenetetramine-hydrogen-oxalate, mono-hexamethylenetetramine - hydrogen - phthalate, mono-hexamethylenetetramine - hydrogen-phosphate, di - hexamethylenetetramine - hydrogen-tetra-borate, etc.

When using a compound such as mono-hexamethylenetetramine-hydrogen-oxalate as a coating on the abrasive grains, as through the use of Durite No. KV-1000-B, the product mixes better and suspends itself more uniformly on the grains when using the low viscosity coating solution and the product dries out from a wet to a dry workable mix using the same proportions of coating agent and dry resin almost instantly, whereas the straight hexamethylenetetramine addition compound requires approximately 15 minutes' time to dry to a workable mix. This resin has a high acid value (43 ml. normal NaOH to 100 gr. resin) and it is believed that this is also a factor in making the wet mixture dry out quickly. Resins of an acid nature having a pH value lower than 7 are especially useful in making the wet mixture dry out quickly and the addition of acid bodies to resins which normally have a low acid value or may be neutral or alkaline are also useful to quickly convert the mixture to a dry workable state.

Out of a large number of compounds the hardening agent addition product to the resin which gave most consistent strengths while hot was obtained by ball milling with the pulverized resin say roughly 5% of the resin weight in hexamethylenetetramine and then adding another 5% comprising chiefly mono-hexamethylenetetramine-hydrogen-oxalate and a small percentage as a plasticizer and hardener of mono-hexamethylenetetramine-hydrogen-phthalate, thus producing in situ an equivalent of di-hexamethylenetetramine-hydrogen-oxalate plus the phthalate plasticizer.

These special resin products are likewise valuable because little or no ammonia is liberated during the oven hardening treatment, there is less bloating and chiefly because the finished product has high strength both hot and cold.

While my preferred coating liquids are referred to as aqueous alkaline solutions it is to be understood that alkali and water can be added to an ordinary resin to produce a solution whether this resin be liquid or solid, and that this addition may be made at any time either to the resin or to the mix. Likewise, an aqueous solution insufficiently high in alkali can have an alkali added to it at any time prior to or during use. I do not preclude the addition of alkali to the pulverized resin before or after admixture with the wetted abrasive grains. The sequence of use and the steps of making the mixture are immaterial as any other order or sequence may be followed provided it will produce a wet-dry mix.

While I prefer to use what I call an aqueous alkaline resin solution, it is to be understood that an alkaline liquid or an aqueous alkaline liquid which may or may not have resin added thereto is considered as an equivalent where products of commercial strength and having the characteristics of a wet-dry mix are produced.

Furthermore, while I find that an aqueous alkaline solution is most desirable, it is to be understood that I do not preclude the use of a liquid resin or a liquid resinous coating material which has a viscosity below 375 centipoises at 25° C. which may contain little or no water and may even have a pH value below 7, so long as the reaction in the inactivation of the phenolic (OH) groups is so carried out that the product when used as a coating with or without additions prior to or during the mixing operation will provide my wet-dry mix.

By the term "wet" as used in the application with respect to the character of the mix I refer to a product which has the appearance of being wetted substantially throughout and does not depend upon the outside coating of resin on the abrasive grain remaining in its normal and so-called dry pulverized state. Furthermore, the term "wet" referring to a resin coated abrasive grain refers to a product which is not sufficiently dry to cold mold and therefore has a tendency to adhere to the force plugs of the mold.

By the term "dry" I do not mean an anhydrous product, but refer to a product which appears dry and, furthermore, the resin coated abrasive grains are in a suitable condition of dryness to respond to cold pressing with the force plugs of the mold substantially or commercially clean.

By the term "potentially reactive" I designate a product which melts when heated and flows at ordinary atmospheric pressure and is capable of further reaction, which may but need not be carried to the "infusible stage". The term "infusible stage" designates a product which does not flow or become liquid when heated to any temperature under atmospheric pressure. My definitions with regard to fusible and infusible when applied to synthetic resins are based on Dr. Baekeland's definition of the "A", "B" and "C" stages of resinification.

While my preferred resin is a potentially reactive pulverized synthetic resin I do not wish to limit myself to resins of this type alone inasmuch as I may use any pulverized resin which is suitable for use as a bond in the making of abrasive articles. Such resin may be of natural derivation or may be a mixture of a resin of natural derivation and one of synthetic derivation. A pulverized resin of natural derivation is exemplified by shellac and gum accroides. Additionally either of these resins, and for that matter other natural resins such as dragon's blood, may be rendered additionally heat reactive or potentially reactive through the use of my addition product hardening agents and these hardening agents function exceedingly well in promoting further hardness and hardening reactivity in resins of this character. Furthermore, the inclusion of acid bodies such as oxalic, benzoic or boracic when applied as a coating to the pulverized natural resins makes these more compatible in my process and the products contribute to the wet-dry self-conversion function.

The term "alkaline resin solution" refers to the presence broadly of alkaline materials which may comprise alkali or alkaline earth hydroxides or aromatic or aliphatic amines and which are free to combine with phenolic (OH) groups. While I have in the specification referred chiefly to sodium hydroxide as the preferred alkali, this was purely as a convenience as any other equivalent similar alkali could be used, such as that of potassium, barium, or strontium. Likewise while I prefer the relatively fixed or non-volatile alkaline material, it should be understood that volatile alkaline materials can likewise be used, such as for example ammonia.

The term "phenol" designates not only phenol as such, but its homologues and isomers or various phenolic bodies representing various phenolic reaction products, or refers to mixtures of such phenols and/or such phenolic bodies which are equivalent in this reaction. This term therefore includes phenol-aldehyde reaction or resinification products. By the term "phenol-aldehyde resins" I mean to include not only reaction products formed from phenol and formaldehyde, its polymers and amines, but also substances which may engender formaldehyde and, furthermore, other equivalent aldehydes such as furfural or its various useful derivatives such as furfuramid, furfuryl alcohol; benzaldehyde, or its useful derivatives hydrobenzamid or benzyl alcohol; or acetaldehyde, or its polymer paraldehyde, and for that matter any of the known equivalents of aldehydes in resinification reaction, such as for example the carbohydrates such as cellulose, starch, sugar, etc.

Wherein the aqueous alkaline solution is referred to as an "aqueous alkaline resin solution" it should be understood that I refer to a product which acts as a solution within the dilutions called for and that the product may not of necessity be a true homogeneous solution, but merely substantially homogeneous. That is, it may upon addition of more water precipitate out of solution, presumably due to lowering of the pH value. Furthermore, that other diluents than water can be used so long as these are equivalent to water in producing what I characterize as my wet-dry mix.

Wherein I have referred to a pulverized resin or to a dry pulverized resin whether I stated that such resin was potentially reactive or not, such statement broadly includes any resin which is fusible and is capable of functioning as a bond to provide an abrasive body of commercial strength. This may include natural and synthetic resins of diverse derivation and while I have primarily disclosed potentially reactive or heat-setting resins of the phenol-aldehyde type, other heat-setting resins may be used. Furthermore, resins which merely fuse and have a sufficiently high melting point to act as a bond are likewise useful, such as the vinyl and the styrol resins, or for that matter I find plastic cementitious pulverized cellulose esters and ethers such as cellulose acetate, ethyl cellulose and benzyl cellulose, useful bonds. Such products may be provided in pulverized modifications suitable for my use.

By reference to cold molding I do not mean molding taking place in the total absence of heat, nor necessarily molding at room temperatures, as the use of warm or heated molds is not precluded, but I do mean molding carried out for the purpose primarily of forming or shaping the article to the desired contour, either by pressure, tamping, rolling, etc., the mold being used primarily for this formative act and the product while it may be reacted in the mold is reacted to a point short of the ultimate desired reaction and is then subsequently heated in an oven or under other suitable conditions as a separate and subsequent operation, either in the mold or after removal of the formed object from the mold.

I claim:

1. The method of making abrasive articles which comprises mixing abrasive grains with a resinous coating liquid and a pulverized potentially reactive resin in proportions to produce an initial wet mix, the said coating liquid and pulverized resin having mutually reactive components whereby the initial wet mix produced converts itself upon standing to a dry moldable mix, forming the dry mix into abrasive articles and hardening the same.

2. The method of making abrasive articles which comprises moistening abrasive grains with an aqueous liquid resin coating, adding a pulverized potentially reactive resin the particles of which are moistened by said liquid resin coating to produce an initial wet abrasive mix, the aqueous liquid resin and the added pulverized resin having mutually reactive components whereby preliminary to resinification reaction the said resins are capable of reacting to cause the initial wet mix to convert itself upon standing to a dry granular mix, forming said converted dry mix into abrasive articles and hardening the same.

3. The method of making an abrasive article containing abrasive grains and a resin binder which consists in wetting the surfaces of the grains with a resinous coating liquid of low viscosity, in mixing with the coated grains a pulverized potentially reactive synthetic resin, the coating liquid and the pulverized resin having mutually reactive components which combine to produce an initial wet mix with substantially no vagrant pulverized resin in the mix and which after permitting said mix to stand the wet mix spontaneously changes to a dry mix having discrete resin-coated particles, in then molding and heat hardening the same.

4. The method of making abrasive articles comprising the steps of coating the abrasive grains with a liquid synthetic resin having a specific viscosity within the limits of 50 and 375 centipoises at 25° C. and an added pulverized potentially reactive synthetic resin in proportion to produce an initial wet mix, the said liquid resin and dry resin having mutually reactive components whereby the initial wet mix is self-convertible to a dry mix.

5. The method of making abrasive articles comprising the steps of coating the abrasive grains with an alkaline phenol-aldehyde liquid resin having a specific viscosity within the limits of 50 and 375 centipoises at 25° C. and an added pulverized potentially reactive phenolaldehyde resin producing a wet mix which is self-convertible to a dry mix.

6. The manufacture of abrasive articles comprising the steps of coating the grains with a liquid resin having a viscosity lower than 375 centipoises at 25° C., having phenolic (OH) groups inactivated of from 10 to 40% and having a water content of from 10 to 55%, and adding thereto a pulverized potentially reactive resin in proportion to produce an initial wet mix, the said liquid resin and pulverized resin having mutually reactive components whereby the initial wet mix is self-converted to a dry mix.

7. The manufacture of abrasive articles comprising the steps of coating the grains with a liquid resin having a viscosity in centipoises at 25° C. of from 60 to 200, having phenolic (OH) groups inactivated of from 18 to 27%, having a pH value of from 9.0 to 9.8 and having a water content of from 25 to 45%, and adding thereto a pulverized potentially reactive resin in proportion to produce an initial wet mix, the said liquid resin and pulverized resin having mutually reactive components whereby the initial wet mix is self-converted to a dry mix.

8. The method of making abrasive articles comprising the steps of coating the abrasive grains with a resinous liquid coating and an added pulverized potentially reactive resin, the said added resin having a hardening agent intimately combined therewith in the form of an addition product, the said resinous liquid and the added pulverized resin being in proportion to produce an initial wet mix, the said resinous liquid and the pulverized resin having mutually reactive components whereby the initial wet mix is self-convertible to a dry mix.

9. An abrasive composition suitable for making abrasive articles comprising abrasive grains coated with a resinous alkaline liquid and an added pulverized potentially reactive resin, characterized by being an original wet mix and self-converted to a dry mix on standing.

10. An abrasive product comprising abrasive grains coated with an aqueous alkaline liquid resin having a specific viscosity of between 50 and 375 centipoises at 25° C. and an added pulverized potentially reactive resin, characterized by being an original wet mix and self-converted to a dry mix on standing.

11. In the method of making abrasive articles, the steps comprising coating abrasive grains with a coating resinous liquid having a viscosity in centipoises at 25° C. between the limits of 50 and 375, a pH value above 7, gram moles phenolic (OH) groups inactivated per 100 grams of resin solution of from 0.05 to 0.40, phenolic (OH) groups inactivated of 10 to 40 per cent, "A" stage resinification factor of from 5 to 45, a ratio of alkaline material free to combine with phenolic (OH) groups of from 0.01 to 1.2 and a water content of from 10 to 55 per cent, adding to the coated grains a pulverized resin and forming therefrom a moldable mix, the said resinous liquid and pulverized resin being in proportion to produce an initial wet mix, the said resinous liquid and pulverized resin having mutually reactive components whereby the initial wet mix is self-convertible to a dry mix.

12. In the method of making abrasive articles, the steps comprising coating abrasive grains with a coating resinous liquid having a viscosity in centipoises at 25° C. between the limits of 50 and 375, a pH value above 7, gram moles phenolic (OH) groups inactivated per 100 grams of resin solution of from 0.05 to 0.40, phenolic (OH) groups inactivated of 10 to 40 per cent, "A" stage resinification factor of from 5 to 45, a ratio of alkaline material free to combine with phenolic (OH) groups of from 0.01 to 1.2 and a water content of from 10 to 55 per cent, adding to the coated grains a pulverized resin having a hardening agent combined therewith in the form of an addition product and forming therefrom a moldable mix, the said resinous liquid and pulverized resin being in proportion to produce an initial wet mix, the said resinous liquid and pulverized resin having mutually reactive components whereby the initial wet mix is self-convertible to a dry mix.

13. The method of making abrasive articles comprising the steps of coating the abrasive grains with a liquid coating and an added pulverized potentially reactive resin, the said added resin having intimately combined therewith a hardening agent addition product of hexamethylenetetramine and oxalic acid and a plasticizing type of hardening agent therefor.

14. The method of making an abrasive article which consists in coating the abrasive grains with a resinous liquid and an added dry resin, the resinous liquid including the following components: low reaction products in the range of 40%, high reaction products in the range of 30%, water in the range of 28% and an alkali in the range of 2%, the resinous liquid and the added dry resin being in proportion to produce an initial wet mix, the said resinous liquid and dry resin having mutually reactive components whereby the inital wet mix is self-convertible to a dry mix.

15. An abrasive product comprising abrasive grains coated with a liquid and an added pulverized resin, the added pulverized resin having combined therewith an addition product of hexamethylenetetramine and oxalic acid.

16. The method of making abrasive articles which comprises mixing abrasive grains with an aqueous alkaline resin solution and an added pulverized resin, the said aqueous alkaline resin solution coating the abrasive grains and taking up all of the added pulverized resin whereby there is produced an initial wet abrasive mix wherein the resin is all coated on the abrasive grains and there is no unsuspended dry resin, the said aqueous alkaline resin solution and the added pulverized resin having mutually reactive components whereby the said initial wet abrasive mix converts itself spontaneously on standing to a dry moldable mix composed of individual discrete resin-coated abrasive particles, in then forming the dry mix to a desired form of abrasive article and heat hardening the same.

17. An abrasive product suitable for making abrasive articles comprising abrasive grains coated with an aqueous alkaline resin solution and an added pulverized resin, characterized by being an initial wet abrasive mix self-converted spontaneously on standing to a dry moldable mix, the said aqueous alkaline resin solution coating the abrasive grains and taking up all of the added pulverized resin whereby the intial wet character of the abrasive mix is obtained wherein the resin is all coated on the abrasive grains and there is no unsuspended dry resin, the said aqueous alkaline resin solution and the added pulverized resin having mutually reactive components whereby said initial wet abrasive mix is self-converted to the dry moldable mix.

18. The steps in the method of making an abrasive article which comprise wetting abrasive particles with an alkaline solution, mixing the coated particles with a heat hardenable synthetic resin in finely divided form, and molding the abrasive mix at high pressures and temperatures until the bond is hardened to the infusible state.

19. The steps in the method of making a resin-bonded abrasive article which comprise giving abrasive particles an alkaline coating, mixing the coated particles with a hardenable synthetic resin in in finely divided form, molding the abrasive mix, and hardening the bond to the infusible state.

EMIL E. NOVOTNY.